US012170614B2

(12) United States Patent
Jain et al.

(10) Patent No.: US 12,170,614 B2
(45) Date of Patent: *Dec. 17, 2024

(54) SERVICE CHAINING IN FABRIC NETWORKS

(71) Applicant: Cisco Technology, Inc., San Jose, CA (US)

(72) Inventors: Prakash C. Jain, Fremont, CA (US); Sanjay Kumar Hooda, Pleasanton, CA (US); Vinay Saini, Bangalore (IN); Victor Manuel Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,931

(22) Filed: Dec. 19, 2023

(65) Prior Publication Data

US 2024/0137314 A1 Apr. 25, 2024

Related U.S. Application Data

(63) Continuation of application No. 17/375,748, filed on Jul. 14, 2021, now Pat. No. 11,888,736.

(51) Int. Cl.
*H04L 45/586* (2022.01)
*H04L 12/46* (2006.01)
(Continued)

(52) U.S. Cl.
CPC ............ *H04L 45/586* (2013.01); *H04L 45/04* (2013.01); *H04L 45/306* (2013.01); *H04L 45/54* (2013.01); *H04L 12/4633* (2013.01)

(58) Field of Classification Search
CPC ..... H04L 45/586; H04L 45/04; H04L 45/306; H04L 45/54; H04L 12/4633
See application file for complete search history.

(56) References Cited

U.S. PATENT DOCUMENTS 9,853,898 B1 12/2017 Subramanian
11,159,366 B1 10/2021 Gawade et al.
(Continued)

FOREIGN PATENT DOCUMENTS

WO WO2017015667 A1 1/2017

OTHER PUBLICATIONS

Moreno Cisco Systems D Farinacci Lispers. Net V: "LISP Virtual Private Networks (VPNs)", Internet Society (ISOC) 4, Rue Des No. 4 May 17, 2019 (May 17, 2019), pp. 1-17, Retrieved from the Internet: URL:https://tools.ietf.org/html/draft-ietf-lisp-vpn-04 [retrieved on. May 17, 2019] abstract, Sections I through 4.
(Continued)

*Primary Examiner* — Chris Parry
*Assistant Examiner* — Dixon F Dabipi
(74) *Attorney, Agent, or Firm* — Lee & Hayes, P.C.

(57) ABSTRACT

Techniques are described herein for service chaining in fabric networks such that hardware resources can be preserved without service nodes needing additional capabilities. The techniques may include storing a first configuration associated with a first VRF instance of a service forwarding node that is connected to a first service of a service chain sequence. The first configuration may indicate an identifier and a type associated with a second service of the service chain sequence where traffic is to be sent after the first service. Additionally, the techniques may also include storing a second configuration associated with a second VRF instance of the service forwarding node that is connected to the second service. The second configuration may indicate that the second service is a last service of the service chain sequence. When traffic is received at the service forwarding node, the service forwarding node can determine whether the traffic is pre-service traffic or post-service traffic.

20 Claims, 8 Drawing Sheets

(51) Int. Cl.
  *H04L 45/00*    (2022.01)
  *H04L 45/02*    (2022.01)
  *H04L 45/302*   (2022.01)

(56) References Cited

U.S. PATENT DOCUMENTS

| | | |
|---|---|---|
| 2008/0177896 A1 | 7/2008  | Quinn et al. |
| 2015/0365324 A1 | 12/2015 | Kumar et al. |
| 2016/0226766 A1 | 8/2016  | Al-Zoubi et al. |
| 2017/0134265 A1 | 5/2017  | Haddad et al. |
| 2017/0134538 A1 | 5/2017  | Mahkonen et al. |
| 2017/0155724 A1 | 6/2017  | Haddad et al. |
| 2019/0116119 A1 | 4/2019  | Chu |
| 2019/0149415 A1 | 5/2019  | Pani et al. |
| 2020/0136862 A1 | 4/2020  | Jain et al. |
| 2020/0244582 A1 | 7/2020  | Li et al. |
| 2020/0314029 A1 | 10/2020 | Gopinath |
| 2023/0017053 A1 | 1/2023  | Jain |

OTHER PUBLICATIONS

Office Action for U.S. Appl. No. 17/375,748, mailed on Apr. 28, 2023, Jain, "Service Chaining in Fabric Networks", 29 Pages.
Office Action for U.S. Appl. No. 17/375,748, mailed on Oct. 3, 2022, Jain, "Service Chaining in Fabric Networks", 30 pages.
Office Action for U.S. Appl. No. 17/375,748, mailed on Mar. 29, 2022, Jain, "Service Chaining in Fabric Networks", 20 pages.
Sun Kyoungjae et al : "LISP-Based Integrated Control Plane Framework for Service Function Chaining in Distributed Edge Clouds," IEEE Access, IEEE, USA, vol. 9, Mar. 31, 2021 (Mar. 31, 2021), pp. 52944-52956.

SERVICE CHAINING IN FABRIC NETWORKS

CROSS-REFERENCE TO RELATED APPLICATION

This patent application is a continuation of and claims priority to U.S. patent application Ser. No. 17/375,748, filed Jul. 14, 2021, which is fully incorporated herein by reference.

TECHNICAL FIELD

The present disclosure relates generally to pull-based protocol techniques for service chaining in fabric networks such that hardware resources of the fabric can be preserved without service nodes needing additional capabilities.

BACKGROUND

Processing traffic using a service chain is a typical requirement in secured networks, including 5G mobile, cloud-based, and on-demand networks. When multiple on-demand services are enabled for a certain service chain, these services need to be applied consistently on the same traffic flow and in their specific order. This requirement becomes even more prevalent in certain overlay-based fabric networks. One of the problems arises from the fact that traditional service nodes, which need to apply services, do not support the required encapsulation with tags (e.g., security group tags) used in the overlay header. Another challenge arises from how fabric edge/border nodes, which are connected to these services, are to differentiate between pre-service traffic and post-service traffic such that traffic does not loop back to a service again after that service has already been applied. Additionally, policy-based routing is generally used on the edge/border nodes to redirect traffic to service routers. However, access control lists and/or policies used by the edge/border nodes for policy-based routing do not scale well and can consume a lot of hardware and/or forwarding resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
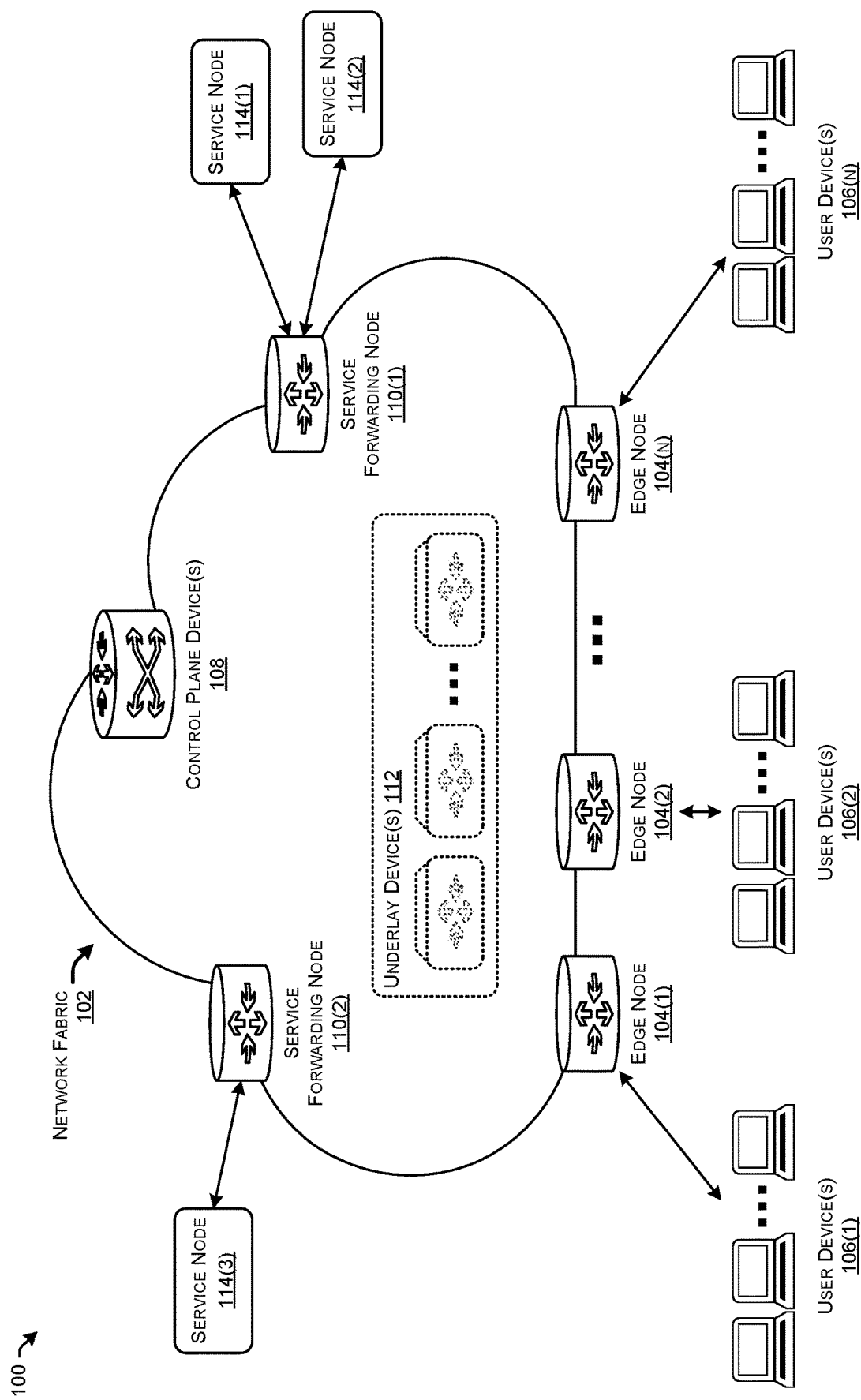
FIG. 1 illustrates a schematic view of an example system-architecture that includes an example network fabric in which traffic may be routed to one or more service nodes of a service chain sequence.
Figure 2A:
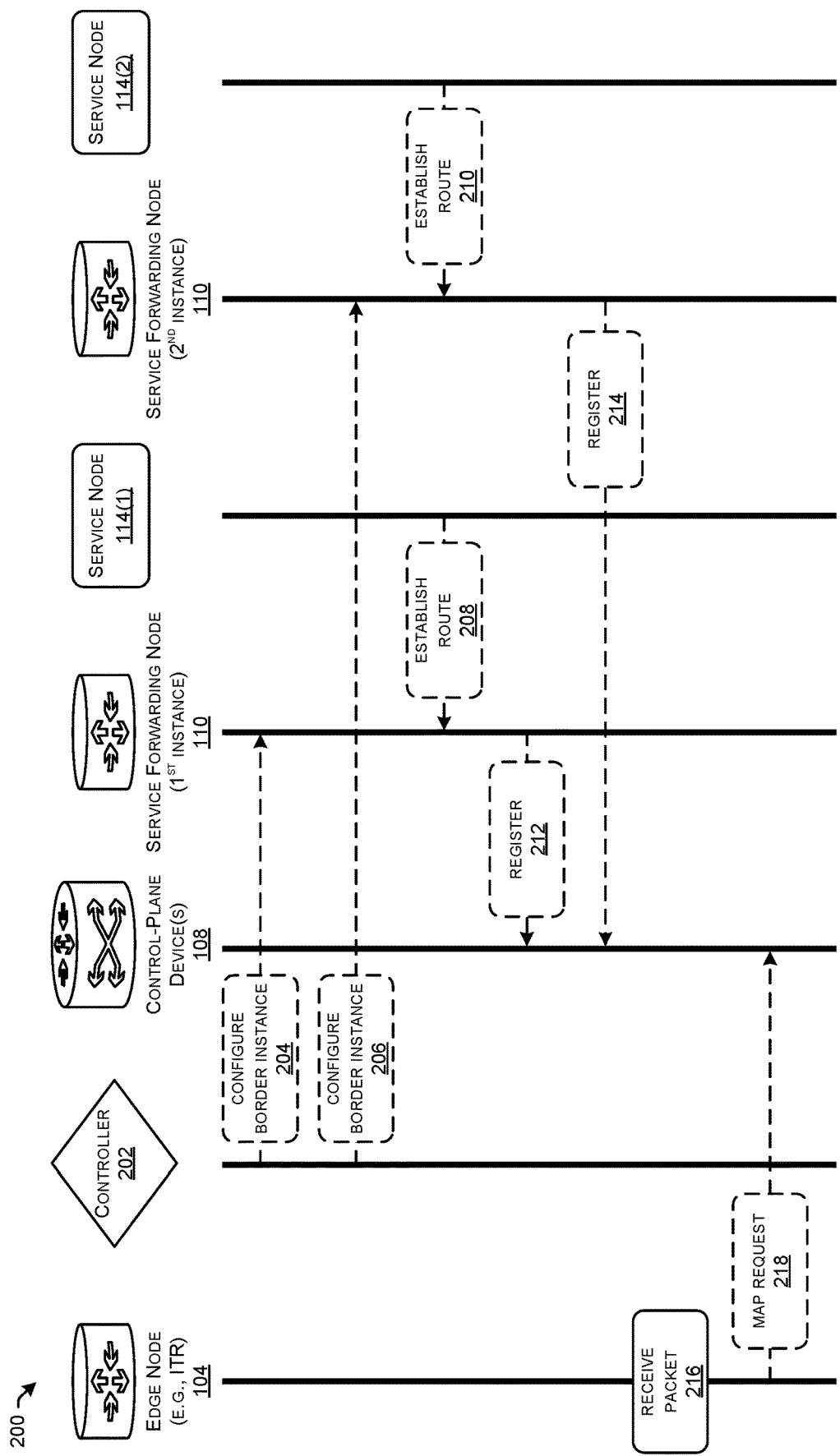
FIGS. 2A-2D are data flow diagrams that collectively illustrate an example data-plane and control-plane traffic flow associated with using a pull-based protocol to send traffic through a service chain.
Figure 2B:
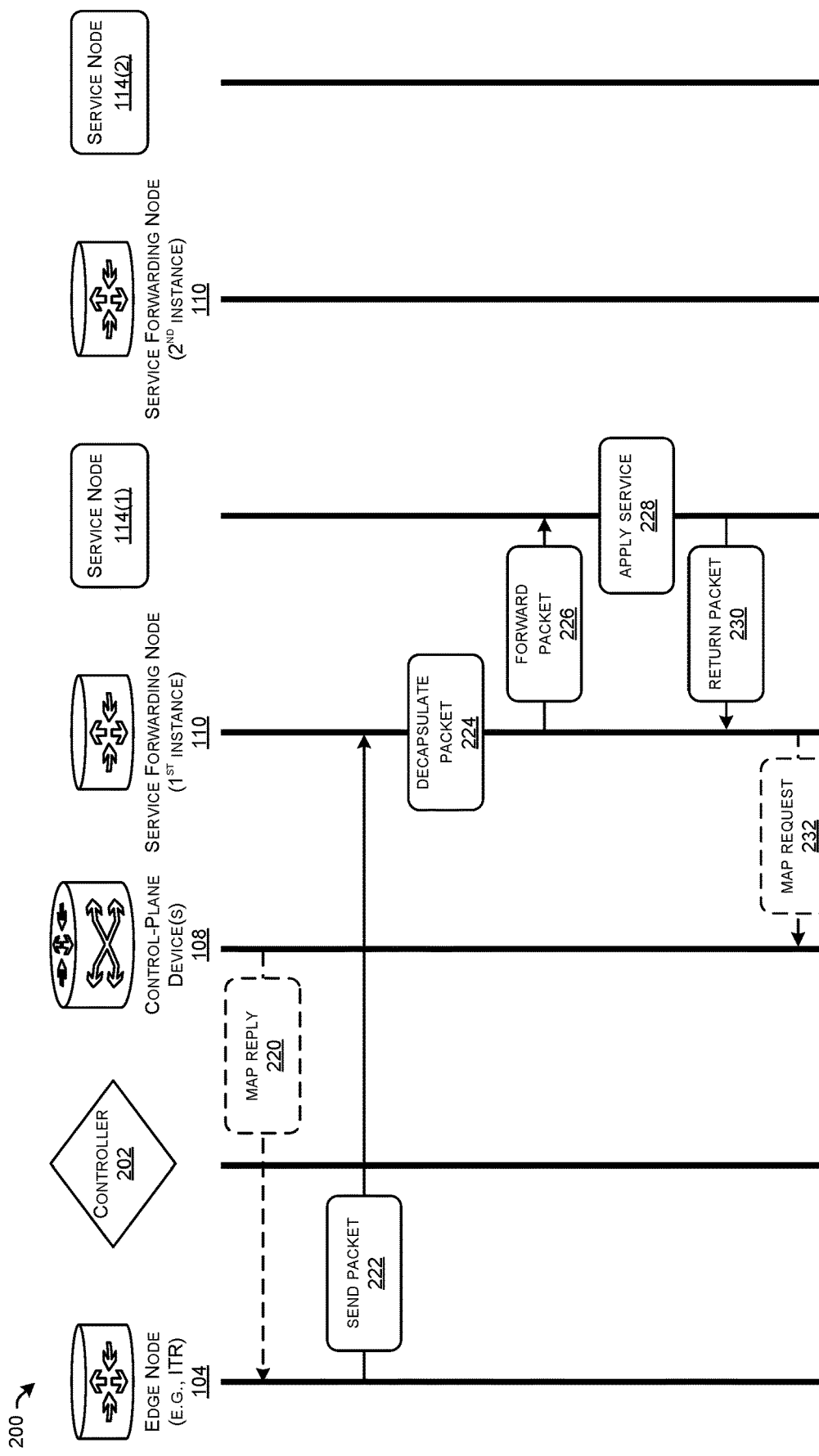
Figure 2C:
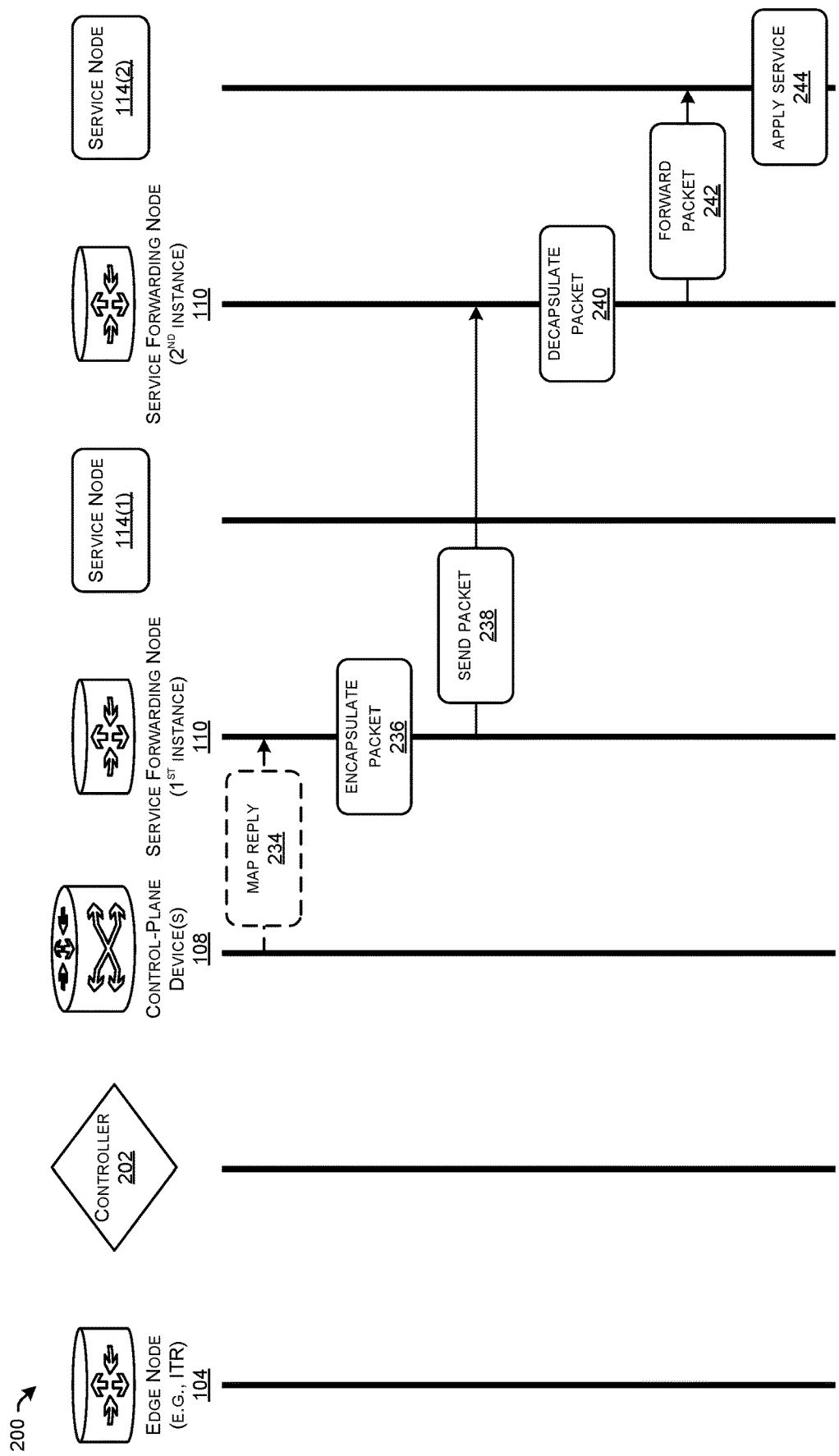
Figure 2D:
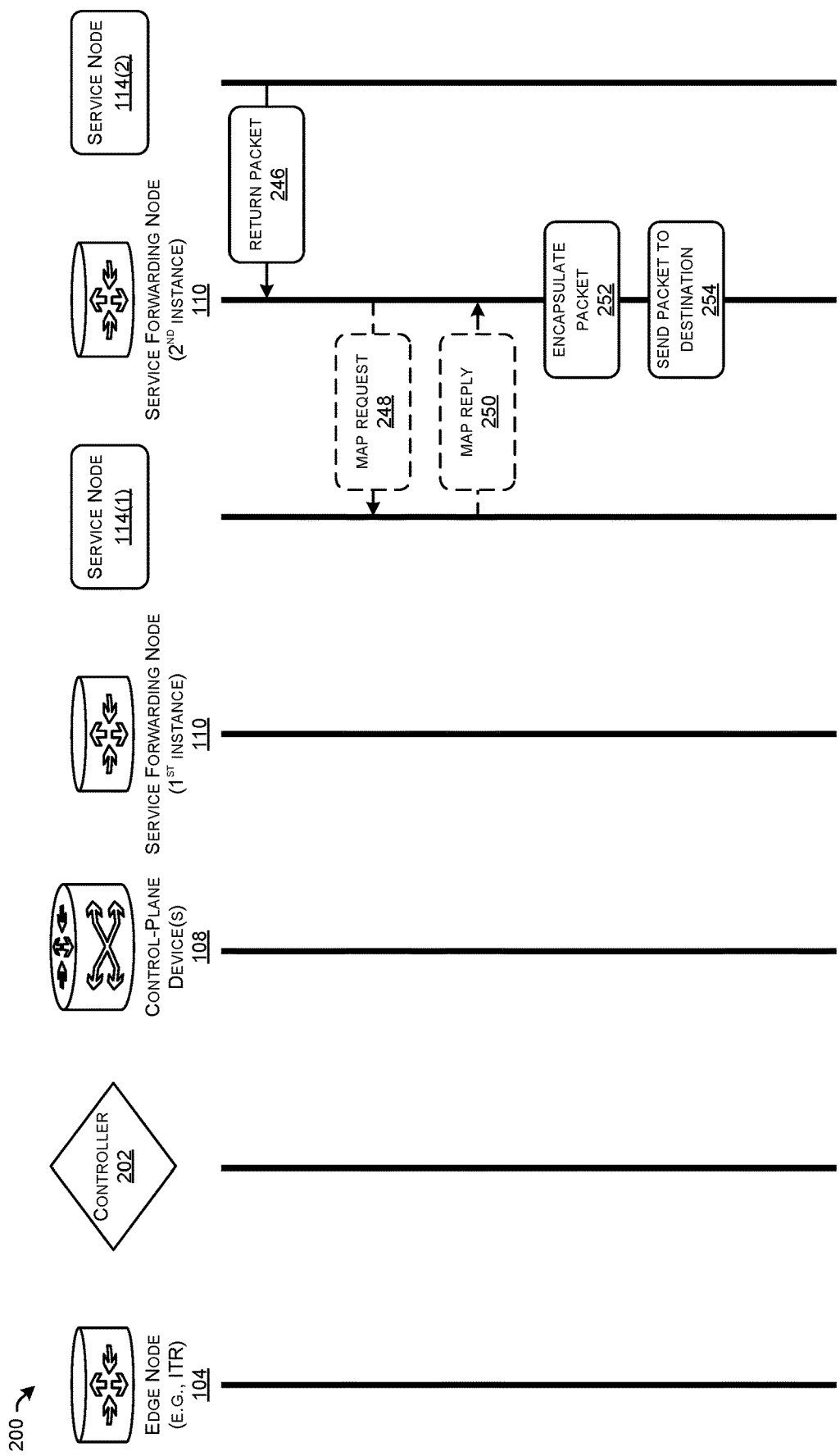

This disclosure describes systems and methods that, among other things, allow for service chaining of traffic in fabric networks such that hardware resources of the fabric can be preserved without service nodes needing additional capabilities. By way of example, and not limitation, a method according to the various techniques described in this disclosure may include storing a first configuration associated with a first virtual routing and forwarding (VRF) instance of a service forwarding node (e.g., edge node, border node, xTR, etc.) of a network, the first VRF instance connected to a first service of a service chain sequence, the first configuration indicating at least an identifier and a type associated with a second service of the service chain sequence where traffic is to be sent after the traffic is received from the first service. The method may further include storing a second configuration associated with a second VRF instance of the service forwarding node or another service forwarding node of the network, the second VRF instance connected to the second service, the second configuration indicating at least that the second service is a last service of the service chain sequence. In this way, the method may include receiving, at the first VRF instance and from the first service, a packet previously sent to the first service by the first VRF instance. Based at least in part on the first configuration, the packet may be sent to the second VRF instance. In some examples, when the second VRF instance receive the packet, the second VRF instance may send the packet to the second service. The method may further include receiving, at the second VRF instance, the packet from the second service, and based at least in part on the second configuration, the second VRF instance may send the packet to a destination device.

Additionally, the techniques described herein may be performed as a method and/or by a system or device having non-transitory computer-readable media storing computer-executable instructions that, when executed by one or more processors, performs the techniques described herein.

EXAMPLE EMBODIMENTS

As discussed above, using a service chain to process traffic is a typical requirement in today's secured networks. However, when multiple on-demand services are enabled for a certain service chain, these services need to be applied consistently on the same traffic flow and in their specific order, and this requirement becomes even more prevalent in certain overlay-based fabric networks. One of the problems arises from the fact that traditional service nodes, which need to apply services, do not support the required encapsulation with tags (e.g., security group tags) used in the overlay header. Another challenge arises from how fabric edge/border nodes, which are connected to these services, are to differentiate between pre-service traffic and post-service traffic such that traffic does not loop back to a service again after that service has already been applied.

Inserting services in a chain within the same Virtual Network (VN) and/or Virtual Routing and Forwarding (VRF) instance (as well as across VRF instances using a common policy framework) when services do not support the fabric encapsulation/decapsulation functionality becomes challenging because it may be necessary to track which service(s) has/have already been applied and which service(s) is/are remaining in the sequence. Accordingly, this application is directed to improvements in technologies that, among other things, allow for service chaining of traffic in fabric networks such that hardware resources of the fabric can be preserved without service nodes needing additional capabilities. The techniques described herein are broadly applicable for use in extranet and/or across VN service chaining scenarios in which multiple service instances of extranet are used for multiple services, as well as in non-extranet and/or intra-VN service chaining scenarios in which multiple boxes/instances are used for multiple services. In at least one example, the techniques described herein include a Locator/Identifier Separation Protocol (LISP) control plane protocol based (e.g., or any other pull-based protocol) technique which works without consuming hardware resources to apply services/traffic-redirection (e.g., no ACLs needed for traffic redirection). This is because LISP map-server/map-resolver (MSMR) can decide a RLOC dynamically per flow based on service RLOC registrations and including, in a map request, the next service to be applied, as discussed in further detail herein.

For extranet-based service chaining, the techniques may include provisioning a LISP extranet with subscriber-to-subscriber communication capabilities and LISP service registration in multiple service instances at a service border with service insertion policies (e.g., match based on groups, application ID, port number, etc.), the current service (e.g., service identifier, type of service, etc.), and the next service in the chain (e.g., next service identifier, next type of service, etc.). In this way, it may be determined whether traffic received at a service border of the fabric network is pre-service traffic or post-service traffic, as well as where the traffic is to be sent next. In some examples, the packet forwarding flow (e.g., data-plane flow) for the extranet-based service chaining may include:

1. All service instances (or service VNs) of extranet may not have any client connected but may do a different service type registration (e.g., with different service identifier based on service chaining order required and the service insertion policy) at the service border (e.g., service egress tunnel router (ETR)) connected to the service node for the service to be applied. Upon ingress of a packet, an Ingress Tunnel Router (ITR) may send a LISP map request indicating a service type and/or service identifier of a service where the packet is to be sent, and a service control plane (e.g., LISP map server) may reply with the registered service-border matching the service type and/or the service identifier and cross VN service instance identifier. The ITR may then send encapsulated traffic (e.g., VXLAN encapsulated traffic) to the service border ETR.
2. At the service border, based at least in part on receiving the incoming encapsulated packets on a "service interface," the service border may decapsulate the packet and directly forward the decapsulated packet to the service node (e.g., using policy routing).
3. After processing the packet on the service node for one service, the service node may return the original packet (decapsulated) to the service border.
4. At the service border, since the packet is decapsulated it may be subjected to ingress tunnel router (ITR) processing and the service border may generate a map-request using the next service type and the next service identifier. The LISP map server may return the next service border (e.g., next service ETR) matching the next service type and the next service identifier with the next service instance (e.g., next service VN). The packet may then be forwarded from the current service instance to the next service instance using LISP extranet capabilities.
5. At the next service border (or in the next service instance), the same service ETR processing (steps 2-4) may be applied for the next service. The final destination instance/VN would be the one where the destination host would be reachable, but no next service left/configured to be applied.

In some examples, the control-plane flow for the extranet-based service chaining may include:

1. The service border may perform a service registration to a service control plane (e.g., LISP map server and/or map resolver) with all policy/parameters required for service insertion in its own VRF.
2. The service control plane may keep that service registration in a separate remote locator database (e.g., as opposed to a registration/mapping database).
3. The service control plane may be provisioned with across VN policies including service insertion policies and allowed services (service chaining service-id/types).
4. When an edge boots up, the edge may ask the service control plane the default edge policies (e.g., per security group, subnet, VN, etc.) and the default service border for it. The service control plane may reply by indicating the registered default service border (e.g., first packet service border) within the same VN to handle the default (e.g., first packet) traffic appropriately.
5. On ingress, a map request may be differentiated and inserted with service indication (e.g., service identifier, service type, source security group, etc.) based on whether it is an original pre-service map request or a post-service map request. This may be determined based on whether the map request originator node is the edge with service insertion configured or the service border who did the "service registration" with next service identifier and next service type.
6. Based on the map request indication, the service control plane may check whether the destination is reachable within the same VRF or across VRF. For across VRF destinations, the service control plane may additionally check extranet and extranet service insertion policy and proceed further only if extranet policy allows.
7. Based on the indication and/or the service identifier, service type, or security group tag (SGT) in the map request, after applying the destination policies the service control plan may reply with the appropriate routing locator (RLOC) for the service border or final destination, as well as any destination parameters needed (e.g., destination security group, destination VN, destination instance, etc.).
8. If the destination policy does not allow the communication (e.g., the SGT/destination group tag (DGT) pair is denied), the service control plan may not reply with a positive map reply (e.g., sends a negative map reply (NMR)) to facilitate the possible dropping of the packet at the source node itself instead of the destination node.

For intra-VN service chaining (non-extranet), the techniques may include provisioning a LISP service registration in multiple service instances at a service border without extranet, but with service insertion policies (e.g., match based on groups, application ID, port number, etc.), the current service (e.g., service identifier, type of service, etc.), and the next service in the chain (e.g., next service identifier, next type of service, etc.). In some examples, each service border instance may do a different service type registration with a different service identifier based on the service chaining order required and the service insertion policy since it is connected to the service node for that service. In some examples, the packet forwarding flow (e.g., data-plane flow) for intra-VN service chaining may include:

1. Upon ingress of a packet, a fabric edge ITR would send a map request with service type and service identifier, and the service control plane (e.g., LISP map server) may reply with registered service border (e.g., service ETR) matching the service type and service identifier. The ITR may then send encapsulated traffic (e.g., VXLAN encapsulated traffic) to the service border ETR.
2. At the service border, based at least in part on receiving the incoming encapsulated packets, the service border may decapsulate the packet and directly forward the decapsulated packet to the service node (e.g., using policy routing).
3. After processing the packet on the service node for one service, the service node may return the original packet (decapsulated) to the service border.
4. At the service border, since the packet is decapsulated it may be subjected to ingress tunnel router (ITR) processing and the service border may generate a map-request using the next service type and the next service identifier. The LISP map server may return the next service border (e.g., next service ETR) matching the next service type and the next service identifier with the next service instance (e.g., next service VN). The packet may then be forwarded from the current service instance/border to the next service instance/border using forwarding plane capabilities (e.g., without using control-plane extranet provisioning).
5. At the next service border (or in the next service instance), the same service ETR processing (steps 2-4) may be applied for the next service. The final destination instance/VN would be the one where the destination host would be reachable, but no next service left/configured to be applied.

In some examples, the control-plane flow for the intra-VN service chaining may include:

1. The service border may perform a service registration to a service control plane (e.g., LISP map server and/or map resolver) with all policy/parameters required for service insertion in its own VN/instance.
2. The service control plane may keep that service registration in a separate remote locator database (e.g., as opposed to a registration/mapping database).
3. When an edge boots up, the edge may ask the service control plane the default edge policies (e.g., per security group, subnet, VN, etc.) and the default service border for it. The service control plane may reply by indicating the registered default service border (e.g., first packet service border) within the same VN to handle the default (e.g., first packet) traffic appropriately.
4. On ingress, a map request may be differentiated and inserted with service indication (e.g., service identifier, service type, source security group, etc.) based on whether it is an original pre-service map request or a post-service map request. This may be determined based on whether the map request originator node is the edge with service insertion configured or the service border who did the "service registration" with next service identifier and next service type. In some examples, to ensure that the service border can have the directly connected hosts, the classification may be extended to include service interfaces.
5. Based on the indication and/or the service identifier, service type, or security group tag (SGT) in the map request, after applying the destination policies the service control plane may reply with the appropriate routing locator (RLOC) for the service border or final destination, as well as any destination parameters needed (e.g., destination security group, destination VN, destination instance, etc.).
6. If the destination policy does not allow the communication (e.g., the SGT/destination group tag (DGT) pair is denied), the service control plane may not reply with a positive map reply (e.g., sends a negative map reply (NMR)) to facilitate the possible dropping of the packet at the source node itself instead of the destination node.

According to the techniques described above and herein, multiple services of a service chain sequence can be applied one after another. Additionally, the services may not need to be necessarily on different service borders, and traffic may be forwarded to different service border instances on the same device/border if the device has that capability natively. Further, the techniques described herein work for both fabric deployments and non-fabric (e.g., traditional) deployments. For instance, in traditional deployments the LISP map-server or map-resolver (MSMR) acts as a service insertion control plane.

By way of example, and not limitation, a method according to the various techniques disclosed herein may include storing a first configuration associated with a first virtual routing and forwarding (VRF) instance of a service forwarding node (e.g., edge node, border node, service-xTR (ingress/egress tunnel router), and the like) of a network. The first VRF instance may be connected to a first service of a service chain sequence. In some examples, the first configuration may indicate a service identifier and/or a service type associated with a second service of the service chain sequence where traffic is to be sent after the traffic is received from the first service. Additionally, or alternatively, the first configuration may indicate a service identifier and a service type (e.g., firewall service, billing service, security service, etc.) associated with the first service. Additionally, or alternatively, the first configuration may indicate one or more service insertion policies. In some examples, the first configuration may be stored on the first VRF instance, the service forwarding node, and/or a control plane of the network.

Additionally, in some examples the method may include storing a second configuration associated with a second VRF instance of the service forwarding node or another service forwarding node of the network. The second VRF instance may be connected to the second service. In some examples, the second configuration may indicate that the second service is a last service of the service chain sequence. For instance, the second configuration may indicate a service identifier and/or a service type associated with the second service, one or more service insertion policies, but the second configuration may not indicate a next service in the chain (e.g., a next service type and/or next service identifier). In some examples, the second configuration may be stored on the second VRF instance, the service forwarding node, the other service forwarding node, and/or the control plane of the network.

In some examples, the service forwarding node may register, with the control plane of the network (e.g., a LISP MSMR), the one or more services that the service forwarding node is connected to. For instance, the service forwarding node (or a VRF instance of the service forwarding node) may register the first service and/or the second service with the control plane. The registration may store an indication with the control plane that the service identifiers and/or service types are accessible through the service forwarding node (or a specific VRF instance of the service forwarding node). For a given service forwarding node instance, for example, registering a service may cause the control plane to associate a service identifier of the service and/or a service type of the service with a routing locator (RLOC) of the service forwarding node and/or the instance of the service forwarding node. Additionally, or alternatively, registering the service may cause the control plane to associate a next service identifier and/or a next service type with the service forwarding node instance such that the control plane is aware of where a given packet is to be sent after being processed by the service.

In some examples, the method may also include receiving, at the first VRF instance, a packet from a client device (e.g., user device) that is accessing the network through an edge node of the network. The received packet may be encapsulated according to a first protocol (e.g., VXLAN) that is used to send traffic through the network. In at least one example, based at least in part on the packet being encapsulated according to the first protocol, the first VRF instance may decapsulate the packet and send the decapsulated packet to the first service. For instance, because the packet is encapsulated, the VRF instance may understand that the packet is pre-service traffic that needs to be forwarded to the service.

In some instances, the method may include receiving, at the first VRF instance and from the first service, the packet that was previously sent to the first service by the first VRF instance. In at least one example, the packet received from the first service is not encapsulated according to the first protocol, so the packet may be subjected to ingress processing. In other words, the first VRF instance may be configured to determine that the packet is post-service traffic because the packet is not encapsulated according to the first protocol.

Based at least in part on the first VRF instance determining that the packet is post-service traffic, the first VRF instance may determine that the packet needs to be sent to the second service based at least in part on the first configuration. To send the packet to the second service, the first VRF instance may need to determine that second service is connected to the second VRF instance. In some examples, the first VRF instance may determine that the second service is connected to the second VRF instance by sending a map request to the control plane of the network (e.g., LISP MSMR). The map request may indicate the identifier and the type associated with the second service, and the map request may be for the control plane to provide a RLOC of a service forwarding node/instance that the second service is located behind. As such, in some examples the method may include receiving, from the control plane, mapping data associated with the second service, the mapping data indicating that the second service is accessible though the second VRF instance of the service forwarding node or the other service forwarding node.

In examples, the method includes sending the packet to the second VRF instance. As described above, the first VRF instance may send the packet to the second VRF instance based at least in part on the first configuration. In at least one example, the first VRF instance may encapsulate the packet according to the first protocol (e.g., VXLAN or an extranet encapsulation protocol) prior to sending the packet to the second VRF instance. Additionally, or alternatively, the first VRF instance may forward the packet to the second VRF instance using a forwarding plane capability of the service forwarding node and/or the network.

The second VRF instance may receive the packet from the first VRF instance. The received packet may be encapsulated according to the first protocol that is used to send traffic through the network. In at least one example, based at least in part on the packet being encapsulated according to the first protocol, the second VRF instance may decapsulate the packet and send the decapsulated packet to the second service. For instance, because the packet is encapsulated according to the first protocol, the second VRF instance may understand that the packet is pre-service traffic that needs to be forwarded to the second service.

In some examples, the second VRF instance may receive the packet back from the second service (e.g., after the second service operates on the packet). In at least one example, the packet received from the second service is not encapsulated according to the first protocol, so the packet may be subjected to ingress processing. In other words, the second VRF instance may be configured to determine that the packet is post-service traffic because the packet is not encapsulated according to the first protocol. Thus, the second VRF instance may, based at least in part on receiving the packet from the second service, send a map request to the control plane. However, because the second configuration indicates that the second service is the last service in the service chain sequence, the map request may indicate the destination device where the packet is to be sent. In other words, the map request may be a request for the control plane to provide at least a RLOC of an edge node that the destination device is located behind.

The method may also include, in some examples, receiving, from the control plane, the mapping data associated with the destination device. The mapping data may include the RLOC associated with the edge node of the network that provides connectivity to the destination device. The second VRF instance may then use the mapping data to send the packet to the destination device.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the exemplary figures are illustrated and described with respect to using a LISP protocol, it is contemplated that the techniques described herein are applicable to other pull-based protocols as well. That is, this disclosure encompasses variations of the embodiments, as described herein. In the figures described below, like numbers refer to like elements throughout.

FIG. 1 illustrates a schematic view of an example system-architecture 100 that includes an example network fabric 102 in which traffic may be routed to one or more service nodes 114 of a service chain sequence. The network fabric 102 includes one or more edge nodes 104(1)-104(N) (hereinafter referred to collectively as "edge nodes 104") that provide one or more user devices 106(1)-106(N) (hereinafter referred to collectively as "user devices 106") with connectivity to the network fabric 102 (where N represents any number greater than or equal to one). The network fabric 102 may also include one or more control plane devices 108, any number of service forwarding nodes, such as service forwarding nodes 110(1) and 110(2), and one or more underlay devices 112. The nodes of the network fabric 102, such as the edge nodes 104, the control plane devices 108, and the service forwarding nodes 110 may, in some examples, send traffic to one another via one or more connections that are facilitated using the underlay devices 112 of the network fabric 102.

The edge nodes 104 of the network fabric 102 may receive traffic from the user devices 106 and, for individual packets of the traffic, make group-based policy decisions to determine whether a specific user device is allowed to send traffic to a specific destination and, if so, under what circumstances. For instance, if a first user device of the user devices 106(1) wishes to send traffic to a second user device of the user devices 106(2) and/or to some other device, then the edge node 104(1) may determine whether the first user device is authorized to do so. By way of example, and not limitation, the edge node 104(1) may store policy data associated with the first user device. The policy data may include a security group tag that is assigned to the first user device and/or a respective user of the first user device. The policy data may further indicate one or more security group tags assigned to one or more other devices that the first user device is authorized to communicate with, as well as under what circumstances the first user device is authorized to communicate with those one or more other devices. Additionally, the edge node 104(1) may receive the policy data from a policy engine of the network fabric. In some examples, the policy may indicate that for the first user device to send traffic to the second user device, the traffic must be sent through a service chain sequence. The service chain sequence may include any number of services associated with the service nodes 114(1), 114(2) and 114(3).

In some examples, in response to receiving a packet from the first user device of the user devices 106(1) the edge node 104(1) may send a map-request to the one or more control plane devices 108 (e.g., a map resolver component of the control plane device(s) 108). The map-request may include an indication of a first service node of the service chain sequence where the packet is to be sent. For instance, the map-request may indicate that the packet is to be sent to the first service node 114(1). Additionally, or alternatively, the map-request may indicate that the packet is to be sent to both the first service node 114(1) and another service node, such as the service node 114(2) and/or the service node 114(3).

In response to receiving the map-request from the edge node 104(1), the control plane device(s) 108 may determine mapping data associated with the service node 114(1). The mapping data may indicate a routing locator corresponding to the service forwarding node 110(1), as well as a specific instance (e.g., VRF or VN instance) of the service forwarding node 110(1) that the service node 114(1) is connected to. After determining the mapping data, the control plane device(s) 108 may send a map-reply message to the edge node 104(1). The map-reply message may indicate the routing locator associated with the service forwarding node 110(1), as well as the specific instance of the service forwarding node 110(1) that the service node 114(1) is connected to, if applicable. This indication of the routing locator, in effect, indicates which specific node that the service node 114(1) is located "behind."

As noted above, the control plane device(s) 108 of the network fabric 102 may store or otherwise have access to mapping data associated with the network fabric 102. For instance, the control plane device(s) 108 may store one or more endpoint identifier-to-routing locator (EID-to-RLOC) mappings. In some examples, an endpoint identifier (EID) may comprise an address prefix value associated with one or more user devices 106 of the network fabric. Additionally, a routing locator (RLOC) may comprise an IP address value corresponding with a specific edge node 104 or service forwarding node 110. In this way, for each one of the EIDs that is stored by the control plane device(s) 108, a respective RLOC is also stored by the control plane device(s) 108 and associated with the EID. Additionally, in some examples, the control plane device(s) 108 of the network fabric 102 may store or otherwise have access to a border/service registration table that may store information about the service forwarding nodes 110, as well as the services 114.

In some examples, the service forwarding nodes 110 may register to the control plane device(s) 108. For instance, the service forwarding node 110(1) may register to the control plane device(s) 108 that the service forwarding node 110(1) is configured as a service ETR. While registering to the control plane device(s) 108, the service forwarding node 110(1) may register information associated with the services it is connected to, as well as service chain information associated with the services. For instance, the service forwarding node 110(1) may register the service nodes 114(1) and 114(2) with the control plane device(s) 108. By registering the service nodes 114 with the control plane device(s) 108, the control plane device(s) 108 may have access to mapping data associated with the services 114, as well as service chain sequence information.

For example, when the service forwarding node 110(1) registers the service node 114(1) with the control plane device(s) 108, the service forwarding node 110(1) may register a service type associated with the service node 114(1) and a service identifier associated with the service node 114(1), as well as a next service type (e.g., associated with the service node 114(2)) and a next service identifier (e.g., also associated with the service node 114(2)) where traffic is to be sent after the first service node 114(1). As the service forwarding node 110(1) registers this information, the control plane device(s) 108 may associate routing locators (RLOCs) with the respective service nodes 114, as well as which specific instances of a service forwarding node that the service nodes 114 are connected to.

FIGS. 2A-2D are data flow diagrams that collectively illustrate an example data-plane and control-plane traffic flow 200 associated with using a pull-based protocol to send traffic through a service chain. In the traffic flow 200, control-plane operations are shown in broken lines, and data-plane operations are shown in solid lines.

At control-plane operation 204, a controller 202 configures a first instance of the service forwarding node 110. For example, the controller 202 may configure the first instance of the service forwarding node 110 with a service type and service identifier to monitor routes/tunnels/connectivity to the first service node 114(1). Similarly, at control-plane operation 206, the controller 202 configures a second instance of the service forwarding node 110. For example, the controller 202 may configure the second instance of the service forwarding node 110 with a service type and service identifier to monitor routes/tunnels/connectivity to the second service node 114(2).

At control-plane operation 208, the first service node 114(1) establishes a route/tunnel/connection with the first instance of the service forwarding node 110. Likewise, at control-plane operation 210, the second service node 114(2) establishes a route/tunnel/connection with the second instance of the service forwarding node 110. In some examples, the controller 202 may configure the routes/tunnels/connections between the service nodes 114(1) and 114(2) prior to the service nodes 114(1) and 114(2) establishing the routes/tunnels/connections.

At control-plane operation 212, the first instance of the service forwarding node 110 registers with the control-plane device(s) 108. For example, the first instance of the service forwarding node 110 may register that the first service node 114(1) is connected to the first instance of the service forwarding node 110. Additionally, the first instance of the service forwarding node 110 may associate a next service type and next service identifier with the first service node 114(1) and/or the first border instance 110 for service chaining. The next service type and the next service identifier may correspond to the second service node 114(2).

At control-plane operation 214, the second instance of the service forwarding node 110 registers with the control-plane device(s) 108. For example, the second instance of the service forwarding node 110 may register that the second service node 114(2) is connected to the second instance of the service forwarding node 110. Additionally, the second instance of the service forwarding node 110 may associate a next service type and next service identifier with the first service node 114(1) and/or the first border instance 110 for service chaining. The next service type and the next service identifier may indicate that the second service node 114(2) is the last service of the service chain sequence.

At data-plane operation 216, the edge node 104 receives a packet. In some examples, the edge node 104 receives the packet from a user device, such as the user device(s) 106. In response to receiving the packet, the edge node 104 may, at control-plane operation 218, send a map request to the control-plane device(s) 108. For instance, based at least in part on a routing policy for sending the packet to a destination device, the edge node 104 may send the map request including an indication of a service type and service identifier of a service where the packet is to be sent. The service type and service identifier may correspond to the service node 114(1).

At control-plane operation 220, the control-plane device(s) 108 may send a map reply to the edge node 104 in response to receiving the map request from the edge node 104. The map reply may indicate that the first service node 114(1) is connected to the first instance of the service forwarding node 110. As such, the map reply may include a routing locator (RLOC) corresponding to the service forwarding node 110, an indication that the service node 114(1) is connected to the first instance of the service forwarding node 110, an IP address of the service node 114(1), and/or the like.

At data-plane operation 222, the edge node 104 may send the packet to the first instance of the service forwarding node 110. The edge node 104 may send the packet to the first instance of the service forwarding node 110 based at least in part on receiving the map reply from the control-plane device(s) 108. That is, the edge node 104 may use the information contained within the map reply to send the packet to the first instance of the service forwarding node 110. In some examples, the edge node 104 may encapsulate the packet according to a first protocol (e.g., VXLAN) to send the packet through the fabric network to the service forwarding node 110.

At data-plane operation 224, the first instance of the service forwarding node 110 may receive the encapsulated packet and decapsulate the packet. Based at least in part on receiving the encapsulated packet, the service forwarding node 110 may, at operation 226, forward the packet (e.g. the decapsulated packet) to the first service node 114(1). In other words, because the packet is encapsulated and received at the first instance of the service forwarding node 110, the service forwarding node 110 may be configured to determine that encapsulated packets are pre-service traffic that needs to be forwarded to the first service node 114(1).

At data-plane operation 228, the service node 114(1) may receive the packet and apply the service. In some examples, the service may be a billing service, security service, firewall service, and/or the like. After applying the service, the service node 114(1) may, at operation 230, return the packet to the first instance of the service forwarding node 110. When the packet is returned to the service forwarding node 110, the packet is decapsulated (e.g., not encapsulated according to the first protocol).

Based at least in part on the packet being decapsulated, the first instance of the service forwarding node 110 may apply ingress processing and send a map request (operation 232) to the control-plane device(s) 108. The map request may include an indication of the service identifier and the service type corresponding to the second service node 114(2).

At control-plane operation 234, the control-plane device(s) 108 may send a map reply to the first instance of the service forwarding node 110 in response to receiving the map request. The map reply may indicate that the second service node 114(2) is connected to the second instance of the service forwarding node 110. As such, the map reply may include a routing locator (RLOC) corresponding to the second instance of the service forwarding node 110, an indication that the second service node 114(2) is connected to the second instance of the service forwarding node 110, an IP address of the second service node 114(2), and/or the like.

At data-plane operation 236, the first instance of the service forwarding node 110 may encapsulate the packet according to the first protocol or a extranet protocol associated with the fabric network. At operation 238, the first instance of the service forwarding node 110 may send the encapsulated packet to the second instance of the service forwarding node 110. In some examples, the first instance of the service forwarding node 110 and the second instance of the service forwarding node 110 are different instances within the same box/device. In other examples, the first instance of the service forwarding node 110 and the second instance of the service forwarding node 110 are on different boxes/devices.

At data-plane operation 240, the second instance of the service forwarding node 110 receives the encapsulated packet and decapsulates the packet. Based at least in part on receiving the encapsulated packet, the second instance of the service forwarding node 110 may, at operation 242, forward the packet (e.g. the decapsulated packet) to the second service node 114(2). In other words, because the packet is encapsulated and received at the second instance of the service forwarding node 110, the service forwarding node 110 may be configured to determine that encapsulated packets are pre-service traffic that needs to be forwarded to the second service node 114(2).

At data-plane operation 244, the service node 114(2) may receive the packet and apply the service. In some examples, the service may be a billing service, security service, firewall service, and/or the like. After applying the service, the service node 114(2) may, at operation 246, return the packet to the second instance of the service forwarding node 110. When the packet is returned to the second instance of the service forwarding node 110, the packet is decapsulated (e.g., not encapsulated according to the first protocol).

Based at least in part on the packet being decapsulated when it is received by the second instance of the service forwarding node 110, the second instance of the service forwarding node 110 may apply ingress processing and send a map request (control-plane operation 248) to the control-plane device(s) 108. The map request may include an indication of a destination device where the packet is to be sent. For instance, because the second instance of the service forwarding node 110 was configured such that the service node 114(2) is the last service of the service chain, the map request may include an indication of the destination device, which the second instance of the service forwarding node 110 may determine from the packet itself.

At control-plane operation 250, the control-plane device(s) 108 may send a map reply to the second instance of the service forwarding node 110 in response to receiving the map request. The map reply may indicate an edge node, service forwarding node, etc. of the network that the destination device is connected to. As such, the map reply may include a routing locator (RLOC) corresponding to the edge node or service forwarding node that the destination device is connected to, an IP address of the destination device, and/or the like.

At data-plane operation 252, the second instance of the service forwarding node 110 may encapsulate the packet according to the first protocol and, at operation 254, the second instance of the service forwarding node 110 may send the encapsulated packet to the destination device.

Figure 3:
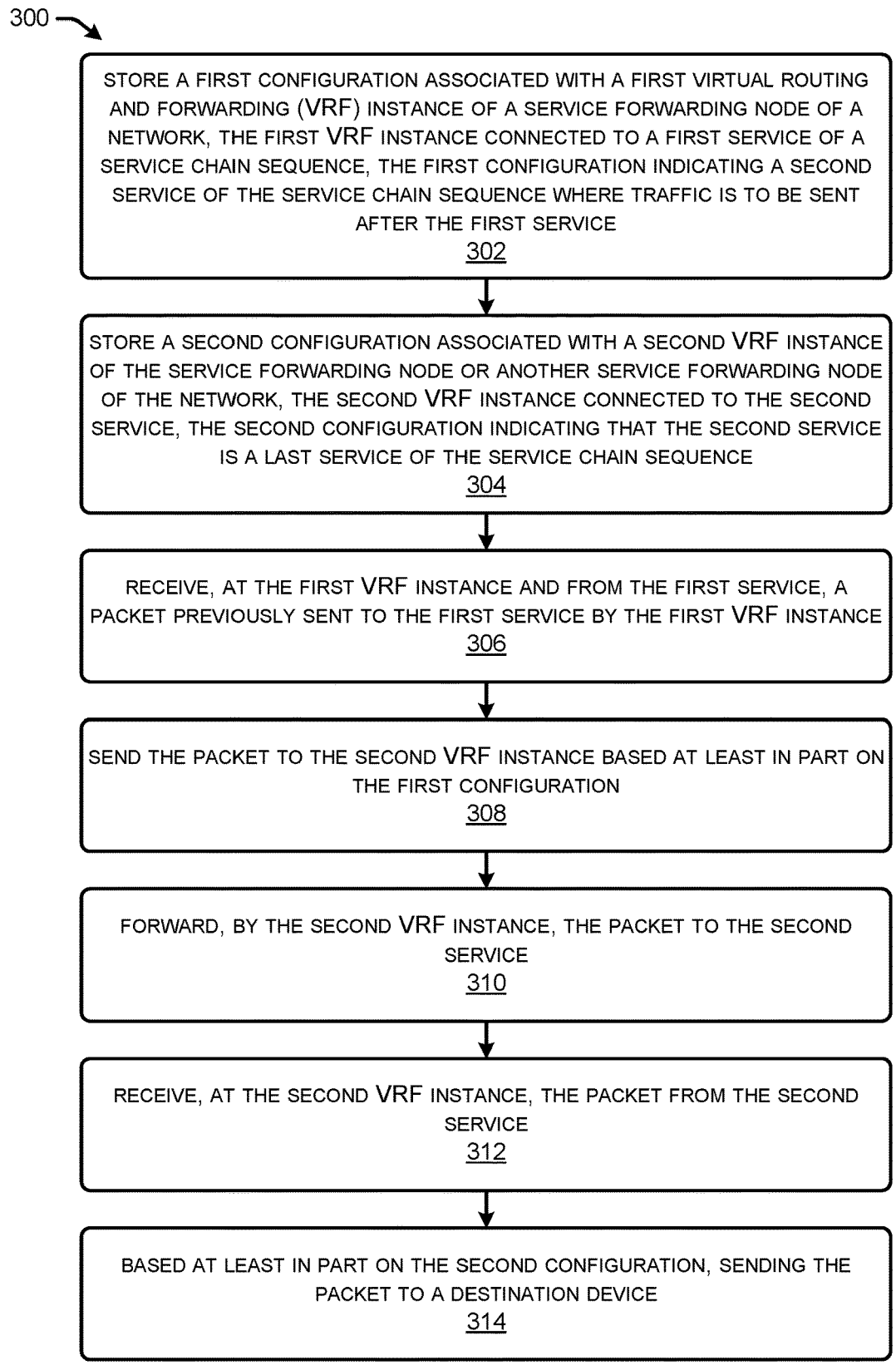
FIG. 3 is a logic flow diagram illustrating an example method for using a pull-based protocol for sending traffic to one or more service nodes of a service chain.

FIG. 3 is a logic flow diagram illustrating an example method 300 for using a pull-based protocol for sending traffic to one or more service nodes of a service chain. The logical operations described herein with respect to FIG. 3 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes storing a first configuration associated with a first virtual routing and forwarding (VRF) instance of a service forwarding node of a network, the first VRF instance connected to a first service of a service chain sequence, the first configuration indicating a second service of the service chain sequence where traffic is to be sent after the first service. For instance, the controller 202 may configure the first VRF instance of the service forwarding node 110(1) of the network fabric 102. Additionally, the first VRF instance may be connected to the first service node 114(1) of a service chain sequence that includes the first service node 114(1) and the second service node 114(2). The first configuration may indicate that traffic is to be sent to the second service node 114(2) after it is received from the first service node 114(1). In some instances, the second configuration may indicate a service identifier and/or a service type associated with the second service node 114(2).

At operation 304, the method 300 includes storing a second configuration associated with a second VRF instance of the service forwarding node or another service forwarding node of the network, the second VRF instance connected to the second service, the second configuration indicating that the second service is a last service of the service chain sequence. For instance, the controller 202 may configure the second VRF instance of the service forwarding node 110(1) of the network fabric 102. Additionally, the second VRF instance may be connected to the second service node 114(2) of the service chain sequence. The second configuration may indicate that the second service node 114(2) is the last service of the service chain sequence.

At operation 306, the method 300 includes receiving, at the first VRF instance and from the first service, a packet previously sent to the first service by the first VRF instance. For instance, the first VRF instance of the service forwarding node 110(1) may receive the packet from the first service node 114(1) after the first VRF instance sent the packet to the first service node 114(1). In other words, the first VRF instance of the service forwarding node 110(1) may receive the packet from the first service node 114(1) after the first service operates on the packet. In at least one example, the packet received from the first service node 114(1) is not encapsulated according to a first protocol, so the packet may be subjected to ingress processing. As such, the first VRF instance may determine that the packet is post-service traffic because the packet is not encapsulated according to the first protocol.

At operation 308, the method 300 includes sending the packet to the second VRF instance based at least in part on the first configuration. For instance, the first VRF instance of the service forwarding node 110(1) may forward the packet to the second VRF instance of the service forwarding node 110(1) based at least in part on the first configuration. In some examples, the first VRF instance may determine that the second service is connected to the second VRF instance by sending a map request to the control plane of the network (e.g., LISP MSMR). The map request may indicate the identifier and the type associated with the second service (included within the first configuration), and the map request may be for the control plane to provide a RLOC of a service forwarding node/instance that the second service is located behind.

At operation 310, the method 300 includes forwarding, by the second VRF instance, the packet to the second service. For instance, the second VRF instance of the service forwarding node 110(1) may forward the packet to the second service node 114(1). In some examples, when the packet is received at the second VRF instance from the first VRF instance, the packet may be encapsulated according to the first protocol that is used to send traffic through the network. As such, based at least in part on the packet being encapsulated according to the first protocol, the second VRF instance may decapsulate the packet and send the decapsulated packet to the second service. For instance, because the packet is encapsulated according to the first protocol, the second VRF instance may understand that the packet is pre-service traffic that needs to be forwarded to the second service.

At operation 312, the method 300 includes receiving, at the second VRF instance, the packet from the second service. For instance, the second VRF instance of the service forwarding node 110(1) may receive the packet from the second service node 114(2). In at least one example, the packet received from the second service is not encapsulated according to the first protocol, so the packet may be subjected to ingress processing. In other words, the second VRF instance may be configured to determine that the packet is post-service traffic because the packet is not encapsulated according to the first protocol.

At operation 314, the method 300 includes, based at least in part on the second configuration, sending the packet to a destination device. For instance, the second VRF instance of the service forwarding node 110(1) may send the packet to one of the user devices 106 based at least in part on the second configuration. For instance, because the second configuration indicates that the second service node 114(2) is the last service of the service chain sequence, the second VRF instance may send the packet to the destination device.

In some examples, the service forwarding node 110(1) may register, with the control plane device(s) 108 of the network fabric 102, the one or more services that the service forwarding node is connected to. For instance, the service forwarding node 110(1) (or a VRF instance of the service forwarding node) may register the first service and/or the second service with the control plane device(s) 108. The registration may store an indication with the control plane device(s) 108 that the service identifiers and/or service types are accessible through the service forwarding node 110(1) (or a specific VRF instance of the service forwarding node). For a given service forwarding node instance, for example, registering a service may cause the control plane device(s) 108 to associate a service identifier of the service and/or a service type of the service with a routing locator (RLOC) of the service forwarding node 110(1) and/or the instance of the service forwarding node. Additionally, or alternatively, registering the service may cause the control plane to associate a next service identifier and/or a next service type with the service forwarding node instance such that the control plane is aware of where a given packet is to be sent after being processed by the service.

Figure 4:
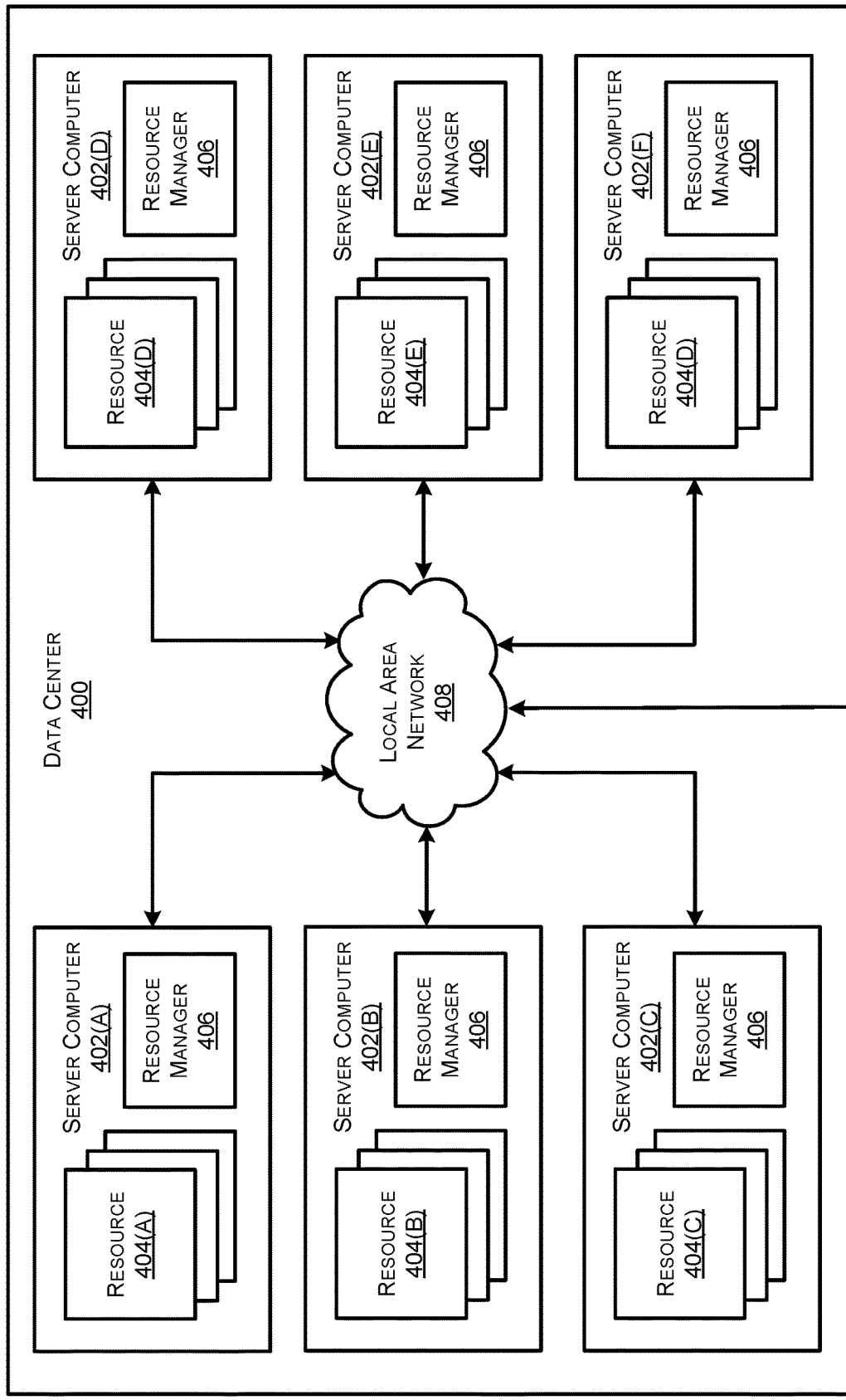
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked device or node described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
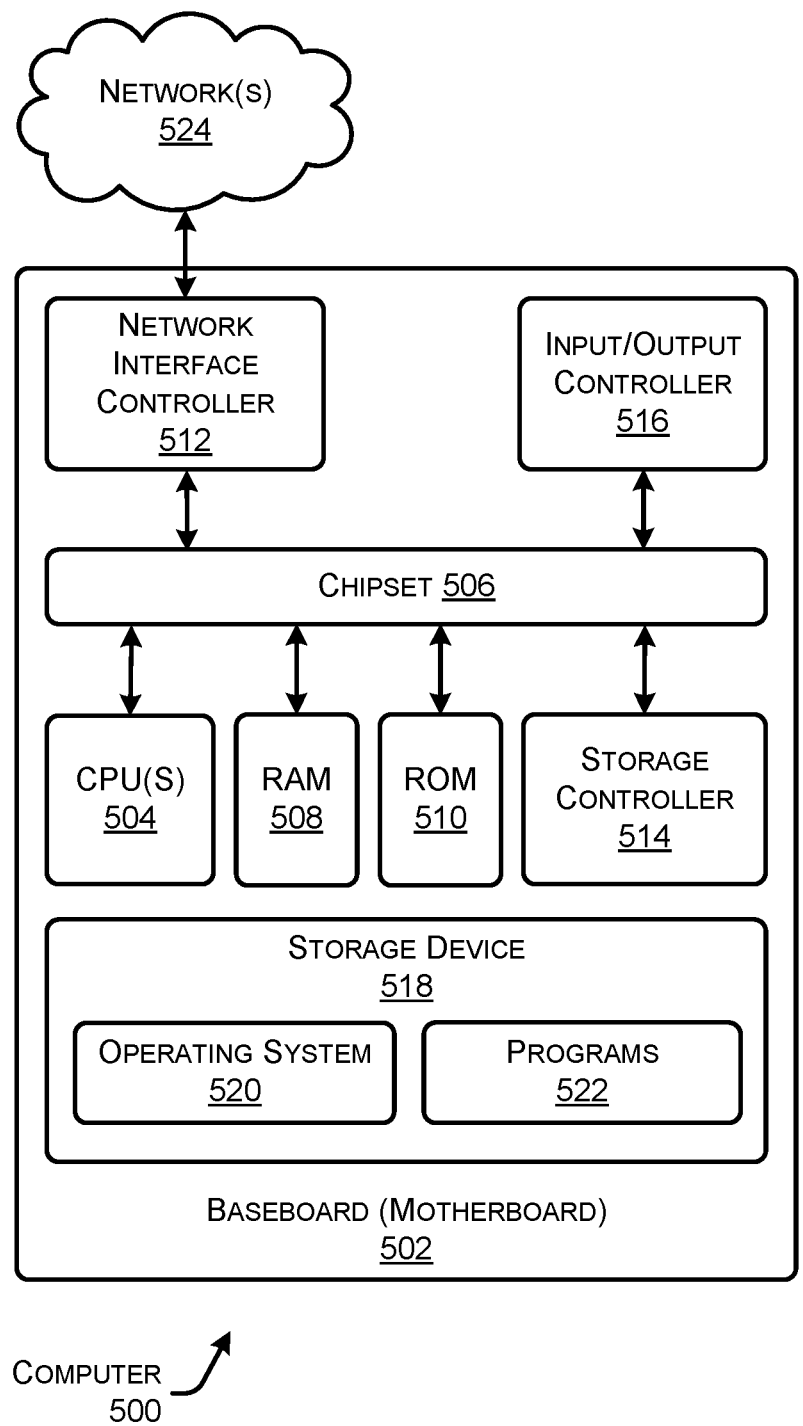
FIG. 5 illustrates a schematic view of an example computer-hardware architecture for implementing a network node and/or device, such as a control plane device, edge node, border node, service forwarding node, etc. that can be utilized to implement aspects of the various technologies presented herein.

FIG. 5 is a computer architecture diagram illustrating an example computer hardware architecture for implementing an inspection device that can be utilized to implement aspects of the various technologies presented herein. The computer 500 shown in FIG. 5 illustrates a conventional server computer 402, edge node 104, control plane device 108, service forwarding node 110, workstation, desktop computer, laptop, tablet, network appliance, e-reader, smartphone, and/or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 may operate in a networked environment using logical connections to remote computing devices and computer systems through a network, such as the networks 524. The chipset 506 can include functionality for providing network connectivity through a NIC 512, such as a gigabit Ethernet adapter. The NIC 512 is capable of connecting the computer 500 to other computing devices over the networks 524 (and/or 102). It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network fabric 102 may be supported by one or more devices similar to computer 500. Stated otherwise, some or all of the operations performed by the network fabric 102, and or any components included therein, may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices or nodes. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for generating a crash-consistent clone of a file stored by a distributed file system and that is usable in a virtual machine. Additionally, the programs 522 may comprise instructions that cause the computer 500 to perform the specific techniques for generating crash-consistent clones of files.

While the invention is described with respect to the specific examples, it is to be understood that the scope of the invention is not limited to these specific examples. For instance, while many of the examples are described with respect to specific protocols (e.g., LISP), it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

storing a first configuration associated with a first virtual routing and forwarding (VRF) instance of a border node that is disposed between an enterprise network domain and an external network domain, the first VRF instance facilitating communications with a first service that is disposed in the external network domain, the first configuration indicating at least an identifier and a type associated with a second service where traffic is to be sent after the traffic is received from the first service, the first service and the second service being part of a service chain;

storing a second configuration associated with a second VRF instance of the border node, the second VRF instance facilitating communications with the second service of the service chain disposed in the external network domain, the second configuration indicating at least that the second service is a last service of the service chain;

receiving, by the border node via the first VRF instance and from the first service, a packet previously sent to the first service by the border node using the first VRF instance, wherein the packet received from the first service is decapsulated such that a header associated with the enterprise network domain is missing from the packet, the header indicative of a next hop for the packet;

based at least in part on the header missing from the packet, sending, by the border node and to a control plane device associated with the enterprise network domain, a request associated with determining the next hop, the request including the identifier and the type associated with the second service of the service chain;

based at least in part on receiving, at the border node and from the control plane device, an indication that the second VRF instance is to be used as the next hop to send the packet to the second service, forwarding the packet from the first VRF instance to the second VRF instance;

determining, by the border node and based at least in part on the second configuration, that the second service is the last service of the service chain; and based at least in part on the second service being the last service of the service chain, forwarding, by the border node, the packet to a destination device subsequent to receiving the packet back from the second service.

2. The method of claim 1, further comprising:

sending, by the border node using the second VRF instance, the packet to the second service; and receiving, at the border node and via the second VRF instance, the packet from the second service.

3. The method of claim 1, further comprising encapsulating the packet according to an extranet encapsulation protocol associated with the enterprise network domain prior to sending the packet to the second VRF instance.

4. The method of claim 1, wherein the packet is forwarded from the first VRF instance to the second VRF instance using a forwarding plane capability of the border node.

5. The method of claim 1, further comprising sending, by the border node based at least in part on receiving the packet from the second service, a request to the control plane of the enterprise network domain, the request associated with determining at least one of an address or a port associated with the destination device where the packet is to be sent.

6. The method of claim 1, further comprising sending, by the border node and to a control plane associated with the enterprise network domain, a request to register, with the control plane, one or more services that the border node is connected to, the one or more services including the first service and the second service.

7. The method of claim 1, wherein the first VRF instance decapsulates the packet to remove the header associated with the enterprise network domain prior to sending the packet to the first service.

8. A system comprising:
one or more processors; and
one or more non-transitory computer-readable media storing instructions that, when executed, cause the one or more processors to perform operations comprising:
storing a first configuration associated with a first virtual routing and forwarding (VRF) instance of a border node that is disposed between an enterprise network domain and an external network domain, the first VRF instance facilitating communications with a first service that is disposed in the external network domain, the first configuration indicating at least an identifier and a type associated with a second service where traffic is to be sent after the traffic is received from the first service, the first service and the second service being part of a service chain;
storing a second configuration associated with a second VRF instance of the border node, the second VRF instance facilitating communications with the second service of the service chain disposed in the external network domain, the second configuration indicating at least that the second service is a last service of the service chain;
receiving, by the border node via the first VRF instance and from the first service, a packet previously sent to the first service by the border node using the first VRF instance, wherein the packet received from the first service is decapsulated such that a header associated with the enterprise network domain is missing from the packet, the header indicative of a next hop for the packet;
based at least in part on the header missing from the packet, sending, by the border node and to a control plane device associated with the enterprise network domain, a request associated with determining the next hop, the request including the identifier and the type associated with the second service of the service chain;
based at least in part on receiving, at the border node and from the control plane device, an indication that the second VRF instance is to be used as the next hop to send the packet to the second service, forwarding the packet from the first VRF instance to the second VRF instance;
determining, by the border node and based at least in part on the second configuration, that the second service is the last service of the service chain; and
based at least in part on the second service being the last service of the service chain, forwarding, by the border node, the packet to a destination device subsequent to receiving the packet back from the second service.

9. The system of claim 8, the operations further comprising:
sending, by the border node using the second VRF instance, the packet to the second service; and
receiving, at the border node and via the second VRF instance, the packet from the second service.

10. The system of claim 8, the operations further comprising encapsulating the packet according to an extranet encapsulation protocol associated with the enterprise network domain prior to sending the packet to the second VRF instance.

11. The system of claim 8, wherein the packet is forwarded from the first VRF instance to the second VRF instance using a forwarding plane capability of the border node.

12. The system of claim 8, the operations further comprising sending, by the border node based at least in part on receiving the packet from the second service, a request to the control plane of the enterprise network domain, the request associated with determining at least one of an address or a port associated with the destination device where the packet is to be sent.

13. The system of claim 8, the operations further comprising sending, by the border node and to a control plane associated with the enterprise network domain, a request to register, with the control plane, one or more services that the border node is connected to, the one or more services including the first service and the second service.

14. The system of claim 8, wherein the first VRF instance decapsulates the packet to remove the header associated with the enterprise network domain prior to sending the packet to the first service.

15. One or more non-transitory computer-readable media storing instructions that, when executed, cause one or more processors to perform operations comprising:
storing a first configuration associated with a first virtual routing and forwarding (VRF) instance of a border node that is disposed between an enterprise network domain and an external network domain, the first VRF instance facilitating communications with a first service that is disposed in the external network domain, the first configuration indicating at least an identifier and a type associated with a second service where traffic is to be sent after the traffic is received from the first service, the first service and the second service being part of a service chain;
storing a second configuration associated with a second VRF instance of the border node, the second VRF instance facilitating communications with the second service of the service chain disposed in the external network domain, the second configuration indicating at least that the second service is a last service of the service chain;
receiving, by the border node via the first VRF instance and from the first service, a packet previously sent to the first service by the border node using the first VRF instance, wherein the packet received from the first service is decapsulated such that a header associated with the enterprise network domain is missing from the packet, the header indicative of a next hop for the packet;
based at least in part on the header missing from the packet, sending, by the border node and to a control plane device associated with the enterprise network domain, a request associated with determining the next hop, the request including the identifier and the type associated with the second service of the service chain;
based at least in part on receiving, at the border node and from the control plane device, an indication that the second VRF instance is to be used as the next hop to send the packet to the second service, forwarding the packet from the first VRF instance to the second VRF instance;

determining, by the border node and based at least in part on the second configuration, that the second service is the last service of the service chain; and based at least in part on the second service being the last service of the service chain, forwarding, by the border node, the packet to a destination device subsequent to receiving the packet back from the second service.

16. The one or more non-transitory computer-readable media of claim 15, the operations further comprising:

sending, by the border node using the second VRF instance, the packet to the second service; and receiving, at the border node and via the second VRF instance, the packet from the second service.

17. The one or more non-transitory computer-readable media of claim 15, the operations further comprising encapsulating the packet according to an extranet encapsulation protocol associated with the enterprise network domain prior to sending the packet to the second VRF instance.

18. The one or more non-transitory computer-readable media of claim 15, wherein the packet is forwarded from the first VRF instance to the second VRF instance using a forwarding plane capability of the border node.

19. The one or more non-transitory computer-readable media of claim 15, the operations further comprising sending, by the border node based at least in part on receiving the packet from the second service, a request to the control plane of the enterprise network domain, the request associated with determining at least one of an address or a port associated with the destination device where the packet is to be sent.

20. The one or more non-transitory computer-readable media of claim 15, the operations further comprising sending, by the border node and to a control plane associated with the enterprise network domain, a request to register, with the control plane, one or more services that the border node is connected to, the one or more services including the first service and the second service.

* * * * *